(12) United States Patent
Matsuoka

(10) Patent No.: US 11,259,076 B2
(45) Date of Patent: Feb. 22, 2022

(54) TACTILE LAUNCHING OF AN ASYMMETRIC VISUAL COMMUNICATION SESSION

(71) Applicant: Google LLC, Mountain View, CA (US)

(72) Inventor: Yoky Matsuoka, Los Altos Hills, CA (US)

(73) Assignee: Google LLC, Mountain View, CA (US)

(*) Notice: Subject to any disclaimer, the term of this patent is extended or adjusted under 35 U.S.C. 154(b) by 478 days.

(21) Appl. No.: 15/840,813

(22) Filed: Dec. 13, 2017

(65) Prior Publication Data
US 2019/0182534 A1    Jun. 13, 2019

(51) Int. Cl.
*H04N 21/436*    (2011.01)
*H04L 67/141*    (2022.01)
(Continued)

(52) U.S. Cl.
CPC ........... *H04N 21/436* (2013.01); *G06F 3/017* (2013.01); *H04L 67/141* (2013.01); *H04L 67/306* (2013.01); *H04N 21/233* (2013.01); *H04N 21/234* (2013.01); *H04N 21/2396* (2013.01); *H04N 21/25866* (2013.01); *H04N 21/41407* (2013.01); *H04N 21/4223* (2013.01); *H04N 21/42203* (2013.01); *H04N 21/42222* (2013.01); *H04N 21/439* (2013.01); *H04N 21/44* (2013.01); *H04N 21/4532* (2013.01); *H04N 21/472* (2013.01); *H04N 21/4788* (2013.01); *H04N 21/4882* (2013.01)

(58) Field of Classification Search
CPC .. H04N 21/436; H04N 21/233; H04N 21/234; H04N 21/4223; H04N 21/439; H04N 21/44; H04N 21/4532; H04N 21/472; H04N 21/4882; G06F 3/017; H04L 67/141; H04L 67/306; H04L 12/283; H04L 12/2807; H04L 12/2816; G07C 9/00111; G07C 9/00103; G08B 21/22; G05B 15/02; G06N 5/048
See application file for complete search history.

(56) References Cited

U.S. PATENT DOCUMENTS 5,819,263 A * 10/1998 Bromley ................ G06Q 10/10
5,945,988 A * 8/1999 Williams ............. G11B 27/105
348/E17.005

(Continued)

*Primary Examiner* — An Son P Huynh
(74) *Attorney, Agent, or Firm* — Kilpatrick Townsend & Stockton LLP

(57) ABSTRACT

Various arrangements for initiating and conducting asymmetrical video communication are presented. A streaming video and audio device may detect an acceleration of the streaming video and audio device over a predefined acceleration threshold. In response, the streaming video and audio device may transmit an acceleration-triggered asymmetrical video communication request to a cloud-based communication server system. The cloud-based communication server system may determine a user account that is linked with the video and audio capture device from which the acceleration-triggered asymmetrical video communication request was received. In response, an acceleration-triggered asymmetrical video communication link may be established between the video and audio capture device and an application executed by a mobile device.

20 Claims, 8 Drawing Sheets

(51) Int. Cl.
| | |
|---|---|
| H04L 67/306 | (2022.01) |
| G06F 3/01 | (2006.01) |
| H04N 21/439 | (2011.01) |
| H04N 21/472 | (2011.01) |
| H04N 21/234 | (2011.01) |
| H04N 21/233 | (2011.01) |
| H04N 21/488 | (2011.01) |
| H04N 21/4223 | (2011.01) |
| H04N 21/45 | (2011.01) |
| H04N 21/44 | (2011.01) |
| H04N 21/4788 | (2011.01) |
| H04N 21/414 | (2011.01) |
| H04N 21/422 | (2011.01) |
| H04N 21/258 | (2011.01) |
| H04N 21/239 | (2011.01) |

(56) References Cited

U.S. PATENT DOCUMENTS

| | | | | |
|---|---|---|---|---|
| 6,359,557 | B2 * | 3/2002 | Bilder | G08B 21/0415 340/531 |
| 8,789,093 | B2 * | 7/2014 | Medina | G08B 13/196 725/37 |
| 9,165,406 | B1 * | 10/2015 | Gray | G06K 9/00456 |
| 9,203,809 | B2 * | 12/2015 | Kim | H04L 61/2514 |
| 9,377,157 | B1 * | 6/2016 | Kilgore | F16M 11/2064 |
| 9,396,599 | B1 * | 7/2016 | Malhotra | G07C 9/00174 |
| 9,510,047 | B2 * | 11/2016 | Arai | H04N 21/4325 |
| 9,781,285 | B2 * | 10/2017 | Kim | H04L 12/282 |
| 9,886,261 | B1 * | 2/2018 | Hotchkies | G06F 8/65 |
| 9,900,177 | B2 * | 2/2018 | Holley | G07C 9/00571 |
| 10,298,751 | B1 * | 5/2019 | Liu | H04L 65/1059 |
| 2001/0048685 | A1 * | 12/2001 | Park | H04N 21/6131 370/401 |
| 2002/0016971 | A1 * | 2/2002 | Berezowski | G08B 13/19693 725/105 |
| 2004/0113770 | A1 * | 6/2004 | Falk | G08B 13/19645 340/531 |
| 2005/0198063 | A1 * | 9/2005 | Thomas | G05B 15/02 |
| 2005/0280704 | A1 * | 12/2005 | Clare | G08B 13/1672 348/143 |
| 2006/0025132 | A1 * | 2/2006 | Karaoguz | H04L 12/2803 455/433 |
| 2007/0157281 | A1 * | 7/2007 | Ellis | H04N 7/17309 725/134 |
| 2007/0192486 | A1 * | 8/2007 | Wilson | H04L 12/282 709/225 |
| 2007/0216764 | A1 * | 9/2007 | Kwak | G07C 9/00309 348/14.06 |
| 2007/0268121 | A1 * | 11/2007 | Vasefi | G06Q 10/06 340/506 |
| 2008/0001735 | A1 * | 1/2008 | Tran | G06F 19/3418 340/539.22 |
| 2008/0022322 | A1 * | 1/2008 | Grannan | H04N 5/44591 725/78 |
| 2008/0056481 | A1 * | 3/2008 | Scott | H04L 29/12122 379/355.03 |
| 2008/0092156 | A1 * | 4/2008 | Ferrone | H04H 60/33 725/13 |
| 2008/0092199 | A1 * | 4/2008 | McCarthy | H04N 7/165 725/133 |
| 2008/0168348 | A1 * | 7/2008 | Bergstrom | H04L 51/04 715/700 |
| 2008/0258913 | A1 * | 10/2008 | Busey | G08B 21/0415 340/540 |
| 2009/0150925 | A1 * | 6/2009 | Henderson | H04N 7/163 725/34 |
| 2009/0207993 | A1 * | 8/2009 | Kelso | H04M 1/2745 379/216.01 |
| 2011/0016492 | A1 * | 1/2011 | Morita | H04N 5/44543 725/58 |
| 2011/0053577 | A1 * | 3/2011 | Lee | H04M 1/72552 455/418 |
| 2011/0069940 | A1 * | 3/2011 | Shimy | G11B 27/105 386/296 |
| 2011/0072114 | A1 * | 3/2011 | Hoffert | G06F 16/9577 709/219 |
| 2011/0109570 | A1 * | 5/2011 | Mady | G06F 3/0488 345/173 |
| 2011/0150431 | A1 * | 6/2011 | Klappert | H04N 7/163 386/296 |
| 2011/0164175 | A1 * | 7/2011 | Chung | H04N 21/4126 348/468 |
| 2013/0173765 | A1 * | 7/2013 | Korbecki | H04N 21/42209 709/221 |
| 2013/0179926 | A1 * | 7/2013 | White | H04L 12/2809 725/59 |
| 2013/0329050 | A1 * | 12/2013 | Pham | H04N 7/181 348/159 |
| 2014/0040955 | A1 * | 2/2014 | McKissick | H04N 5/44513 725/40 |
| 2014/0075464 | A1 * | 3/2014 | McCrea | G06F 19/3418 725/14 |
| 2014/0266710 | A1 * | 9/2014 | Nguyen | H04M 1/00 340/539.13 |
| 2014/0344839 | A1 * | 11/2014 | Woods | H04N 21/488 725/9 |
| 2015/0026618 | A1 | 1/2015 | Stone | |
| 2015/0026620 | A1 | 1/2015 | Kwon et al. | |
| 2015/0082225 | A1 * | 3/2015 | Shearer | G06F 3/0482 715/771 |
| 2015/0116108 | A1 * | 4/2015 | Fadell | G08B 19/005 340/501 |
| 2015/0156031 | A1 * | 6/2015 | Fadell | H04L 12/2816 700/276 |
| 2015/0178721 | A1 * | 6/2015 | Pandiarajan | G06Q 20/382 705/75 |
| 2015/0281762 | A1 * | 10/2015 | Klappert | H04N 21/42201 725/37 |
| 2015/0310381 | A1 * | 10/2015 | Lyman | G06Q 10/083 705/330 |
| 2015/0347683 | A1 * | 12/2015 | Ansari | H04L 63/08 726/7 |
| 2015/0347910 | A1 * | 12/2015 | Fadell | G05B 19/042 706/46 |
| 2015/0350031 | A1 * | 12/2015 | Burks | H04L 41/22 715/736 |
| 2015/0373173 | A1 * | 12/2015 | Taher | H04M 1/72519 370/328 |
| 2016/0248847 | A1 * | 8/2016 | Saxena | H04L 67/18 |
| 2016/0284170 | A1 * | 9/2016 | Kasmir | H04L 12/2818 |
| 2016/0302155 | A1 * | 10/2016 | Nilsson | H04W 52/0254 |
| 2017/0006051 | A1 * | 1/2017 | Gould | H04L 63/1416 |
| 2017/0048495 | A1 * | 2/2017 | Scalisi | H04L 12/2818 |
| 2017/0070775 | A1 * | 3/2017 | Taxier | H04L 12/2825 |
| 2017/0156107 | A1 * | 6/2017 | Tanabe | H04W 64/006 |
| 2017/0187995 | A1 * | 6/2017 | Scalisi | H04N 7/186 |
| 2017/0199934 | A1 * | 7/2017 | Nongpiur | G06F 17/30769 |
| 2017/0251035 | A1 * | 8/2017 | Siminoff | H04L 65/1069 |
| 2018/0103238 | A1 * | 4/2018 | Wu | H04N 7/186 |
| 2018/0330169 | A1 | 11/2018 | Van Hoof et al. | |

\* cited by examiner

TACTILE LAUNCHING OF AN ASYMMETRIC VISUAL COMMUNICATION SESSION

BACKGROUND

Smart devices are becoming more prevalent in homes, offices, and other locations. One common smart device is a streaming video camera. Such a streaming video camera may be conspicuously or inconspicuously placed indoors or outdoors. Such a streaming video camera typically transmits a video and audio stream to a remote device or server system for storage. An authorized user may then use a computerized device to access and view the video and listen to the audio.

SUMMARY

Various embodiments are described related to an asymmetrical video communication system. In some embodiments, an asymmetrical video communication system is described. The system may include an application executed using one or more processors of a mobile device. The mobile device may include a display, a microphone, and a speaker. The system may include a video and audio capture device including a housing, one or more processors housed by the housing, a video camera housed by the housing, a microphone housed by the housing, a speaker housed by the housing, and an accelerometer housed by the housing. The video and audio capture device may not have an electronic display. In response to detecting an acceleration over a predefined acceleration threshold, an acceleration-triggered asymmetrical video communication request may be caused to be transmitted to a cloud-based communication server system. The cloud-based communication server system may be configured to receive the acceleration-triggered asymmetrical video communication request from the video and audio capture device. The system may determine a user account from a plurality of user accounts that is linked with the video and audio capture device from which the acceleration-triggered asymmetrical video communication request was received. The system may establish an acceleration-triggered asymmetrical video communication link between the application executed by the mobile device and the video and audio capture device. The video and audio captured using the video and audio capture device may be streamed via the cloud-based communication server system to the application and audio captured by the mobile device may be streamed via the cloud-based communication server system to the video and audio capture device. The video may not be streamed from the mobile device to the cloud-based communication server system or to the video and audio capture device.

Embodiments of a such a system may include one or more of the following features: The cloud-based communication server system may be configured to transmit a request to the application executed by the mobile device based on the application being linked with the user account in response to receiving the acceleration-triggered asymmetrical video communication request. The mobile device may be configured to present a notification indicative of the request in response to receiving the request for the acceleration-triggered asymmetrical video communication link. In response to user input provided in response to the presented notification, the application executed by the mobile device may be configured to cause an activation request to be transmitted to the cloud-based communication server system. The system may be configured to establish the acceleration-triggered asymmetrical video communication link between the application executed by the mobile device and the video and audio capture device based on receipt of the activation request. The system may be configured to transmit a picture captured by the video and audio capture device as part of the notification. The picture may be captured based on the video and audio capture device detecting the acceleration over the predefined acceleration threshold. The system may be configured to transmit a video clip captured by the video and audio capture device as part of the notification. The video clip may be captured based on the video and audio capture device detecting the acceleration over the predefined acceleration threshold. The video clip may temporally span from before the video and audio capture device detected the acceleration over the predefined acceleration threshold until after the video and audio capture device detected the acceleration over the predefined acceleration threshold. The acceleration over the predefined acceleration threshold may be indicative of a user performing a tap on the housing of the video and audio capture device. The acceleration-triggered asymmetrical video communication request to be transmitted to a cloud-based communication server system may be transmitted by the video and audio capture device in response to detecting multiple distinct instances of acceleration greater than the predefined acceleration threshold with a predefined period of time. The video and audio capture device may be configured to transmit a pattern indication to the cloud-based communication server system. The pattern indication may indicate a number of distinct instances of acceleration greater than the predefined acceleration threshold within the predefined period of time. The system may be configured to determine the user account from the plurality of user accounts at least partially based on the pattern indication. The video and audio capture device may include a light and the video and audio capture device may be configured to change an illumination state of the light in response to the acceleration-triggered asymmetrical video communication request being transmitted.

In some embodiments, a method for initiating and conducting asymmetrical video communication is described. The method may include detecting, by a streaming video and audio device, an acceleration of the streaming video and audio device over a predefined acceleration threshold. The method may include transmitting, by a streaming video and audio device, an acceleration-triggered asymmetrical video communication request to a cloud-based communication server system in response to detecting the acceleration of the streaming video and audio device over the predefined acceleration threshold. The video and audio capture device may not have an electronic display. The method may include receiving, by the cloud-based communication server system, the acceleration-triggered asymmetrical video communication request from the video and audio capture device. The method may include determining, by the cloud-based communication server system, a user account that is linked with the video and audio capture device from which the acceleration-triggered asymmetrical video communication request was received. The method may include establishing, by the cloud-based communication server system, an acceleration-triggered asymmetrical video communication link between the video and audio capture device and an application executed by a mobile device that may include a display, microphone, and speaker. The method may include streaming video and audio captured using the video and audio capture device via the cloud-based communication server system to the application and audio captured by the mobile device may be streamed via the cloud-based communication server system to the video and audio capture device.

Embodiments of such a method may include one or more of the following features: The method may include transmitting, by the cloud-based communication server system, a request to the application executed by the mobile device based on the application being linked with the user account in response to receiving the acceleration-triggered asymmetrical video communication request. The method may include presenting, by the application of the mobile device, a notification indicative of the request in response to receiving the request for the acceleration-triggered asymmetrical video communication link. The method may include causing, by the application an activation request to be transmitted to the cloud-based communication server system in response to user input provided in response to the presented notification. The method may include establishing, by the cloud-based communication server system, the acceleration-triggered asymmetrical video communication link between the application executed by the mobile device and the video and audio capture device based on receipt of the activation request. The method may include transmitting, by the cloud-based communication server system, a picture captured by the video and audio capture device as part of the notification. The picture may be captured based on the video and audio capture device detecting the acceleration over the predefined acceleration threshold. The method may include transmitting, by the cloud-based communication server system, as part of the notification, a video clip captured by the video and audio capture device. The video clip may be captured based on the video and audio capture device detecting the acceleration over the predefined acceleration threshold. The video clip may temporally span from before the video and audio capture device detected the acceleration over the predefined acceleration threshold until after the video and audio capture device detected the acceleration over the predefined acceleration threshold. The acceleration-triggered asymmetrical video communication request may be transmitted to the cloud-based communication server system by the video and audio capture device in response to detecting multiple distinct instances of acceleration greater than the predefined acceleration threshold within a predefined period of time. The method may include transmitting, by the video and audio capture device, a pattern indication to the cloud-based communication server system. The pattern indication may indicate a number of distinct instances of acceleration greater than the predefined acceleration threshold within the predefined period of time. The method may include selecting, by the cloud-based communication server system, the user account from a plurality of user accounts at least partially based on the pattern indication. The method may include altering, by the video and audio device, an illumination state of a light in response to the acceleration-triggered asymmetrical video communication request being transmitted.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
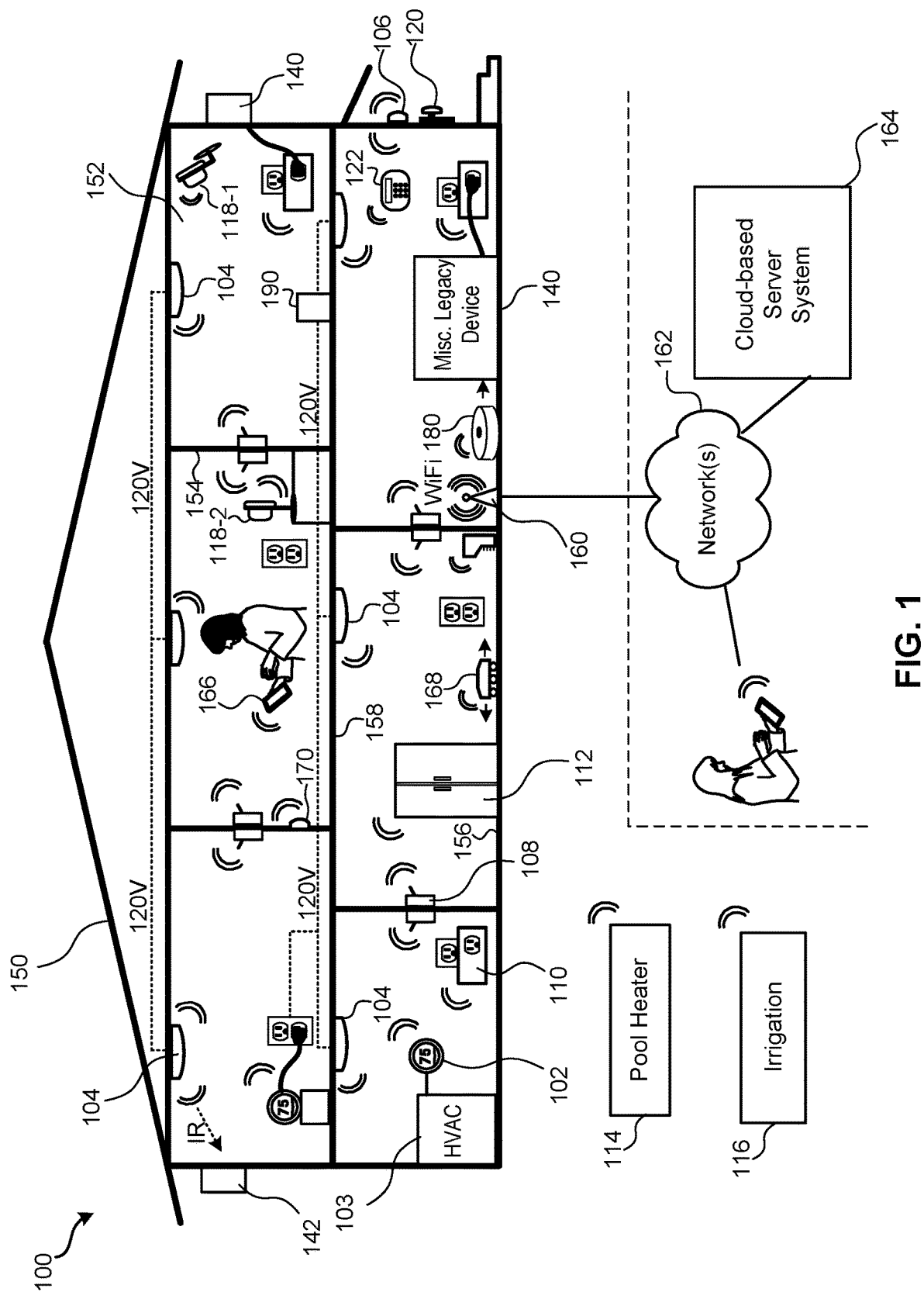
FIG. 1 illustrates an embodiment of a smart home environment.

A video and audio capture device, such as a streaming video camera, may capture video and, possibly, audio. This video and audio may be streamed or otherwise transmitted for remote storage. For instance, a cloud-based host server may store video and audio captured by the capture device for an indefinite or rolling window of time. Such a capture device may primarily be used for capturing video and audio. Therefore, such a capture device might have a speaker and/or a status light, but may not have a display capable of presenting video. Further, other hardware and associated features may be absent from such a capture device. For instance, no user interface, such as one or more buttons, may be present. In other cases, even if there are some buttons or control inputs provided on the device, those items are often designed to be accessed solely or primarily by a technician or a sophisticated user during initial device configuration or troubleshooting, and thus are often compact and/or hidden and not meant for regular everyday interaction with general users.

Video and audio captured by such a capture device is viewed by a user, who is usually remote from the capture device (e.g., in a different room, on a different floor, in a different building, in a different city or other geography, etc.) using a computerized communication device that includes a display. For instance, a smartphone, tablet computer, laptop computer, baby monitor, or desktop computer may be used for viewing such video and audio. Such devices typically have a display, a speaker, and a microphone. The video and audio may be viewed "live" or in "real time" (i.e., the video and audio is streamed to the computerized communication device over a data network, such as by a remote host server or in some cases directly from device-to-device, as soon as practicable upon receipt from the capture device). As such, a user can view, approximately in real time, what is occurring within the field-of-view of the capture device. Since the capture device may have a microphone and a speaker, the user viewing the audio and video on the computerized communication device can interact (e.g., have a conversation) with a person present near the capture device via a live communication link.

Such live communication, however, can be asymmetrical in multiple respects. First, while the user of the computerized communication device can view video captured by the capture device, the person present near the capture device may not have access to a video feed of the user on the capture device. Second, when a user of the computerized communication device desires to establish a live communication link with the capture device, the user could use the computerized device to launch an application or webpage that establishes the live communication channel. However, the person near the capture device may typically have no way (or a very difficult way) of using the capture device to directly initiate such a live communication link with the user.

In embodiments detailed herein, the capture device may be equipped with a sensor, such as an accelerometer, that can detect physical input (e.g., tactile input) provided to the capture device, such as one or a series of physical "taps." Such a capture device may not have any user input buttons or a display screen. Such one or more taps may trigger a request to be transmitted to a cloud-based server system which also may be used to store captured video and audio. In response to this request, the cloud-based server system may determine: 1) a user account linked with the capture device; and 2) a computerized communication device to be contacted based on the request. The cloud-based server system may establish an asymmetric communication channel between the computerized communication device and the capture device (in which only the computerized device presents video captured by the capture device) in response to the request. Alternatively, in response to the request, a notification may be transmitted to the computerized communication device that gives a user of the computerized communication device the option of establishing the live communication channel with the capture device. Such an arrangement allows a person in the vicinity of the capture device to either initiate or request a live communication channel with a user of the computerized communication device.

Such an arrangement has many uses, but may be particularly useful in certain scenarios, such as when a person nearby the capture device does not readily have access to another communication device, such as a smartphone. For instance, a capture device may primarily be used as a security camera in or near a home. Such a security camera may be used to record video of children, residents, nannies, and visitors to the home (e.g., repairmen, workmen), collectively referred to as "occupants." When an occupant wishes to contact a user who has been linked with the capture device, the occupant may provide physical input to the capture device, such as by tapping the capture device one or more times. This tapping may initiate or request a live communication channel with the user. A possible use case is a child desiring to contact a parent. Another possible use case is a workman desiring to contact a homeowner. Another possible use case is an elderly parent desiring to contact an adult child. Any of such persons may provide designated physical input such as one or multiple taps to the capture device that may trigger the establishment or a request for a live communication link with a designated user.

Further detail regarding such embodiments is provided in relation to the figures. FIG. 1 illustrates an embodiment of a smart home environment 100 in accordance with some implementations detailed herein. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control an HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come). In some implementations, the smart doorbell 106 includes some or all of the components and features of the camera 118-1. In some implementations, the smart doorbell 106 includes a camera 118-1, and therefore, is also called "doorbell camera 106" in this application. Cameras 118-1 and/or 118-2 may function as the video and audio capture device detailed in relation to various embodiments herein. Camera 118 may be mounted in a location, such as indoors and to a wall. Camera 118-2 may function similarly to camera 118-1, but may be placed on a surface. Various embodiments of cameras 118 may be installed indoors or outdoors.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home environment 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet. Through the Internet, the smart devices may communicate with a cloud-based server system 164 (also called a central server system and/or a cloud-computing system herein). Cloud-based server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from cloud-based server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view the status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further includes a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., cameras 118 or doorbell camera 106), metadata output by a smart device, settings information for a smart device, usage logs for a smart device, and the like. In some implementations, local storage device 190 is communicatively coupled to one or more smart devices via a smart home network (e.g., smart home network 202, FIG. 2). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of cameras 118 exceeds the available bandwidth of the external network (e.g., network(s) 162). In some implementations, local storage device 190 temporarily stores video data from one or more cameras (e.g., cameras 118) prior to transferring the video data to a server system (e.g., server system 164).

Further included and illustrated in the exemplary smart-home environment 100 of FIG. 1 are service robots 168, each configured to carry out, in an autonomous manner, any of a variety of household tasks. For some embodiments, the service robots 168 can be respectively configured to perform floor sweeping, floor washing, etc. in a manner similar to that of known commercially available devices such as the Roomba™ and Scooba™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 168 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized air monitor/purifier for an occupant, a particular service robot 168 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 168 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 168, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 168 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 168 can be advised by other smart-home sensors that the temperature and humidity levels are rising in the kitchen, which is nearby the occupant's current dining room location, and responsive to this advisory, the hazard detector service robot 168 will temporarily raise a hazard detection threshold, such as a smoke detection threshold, under an inference that any small increases in ambient smoke levels will most likely be due to cooking activity and not due to a genuinely hazardous condition.

Cameras 118 any other smart home device that has an integrated camera may have one or more sensors incorporated that can detect movement or tactile input. For instance, one or more accelerometers may be incorporated as part of cameras 118 and 118-2 to sense when each camera is moved and/or when each camera is tapped or otherwise touched. Cameras 118 may be incorporated as part of various smart home devices in addition to smart doorbell 106. For instance, a camera similar to cameras 118 may be incorporated as part of thermostat 102, appliance 112, hub device 180, service robot 168, or hazard detector units 104. Each of these devices may be considered a form of video and audio capture device. Such devices may not have a display on which to present video. Further, such device may not have a dedicated user input device, such as one or more buttons, switches, touchpad interfaces, keypads, or touchscreens.

Figure 2:
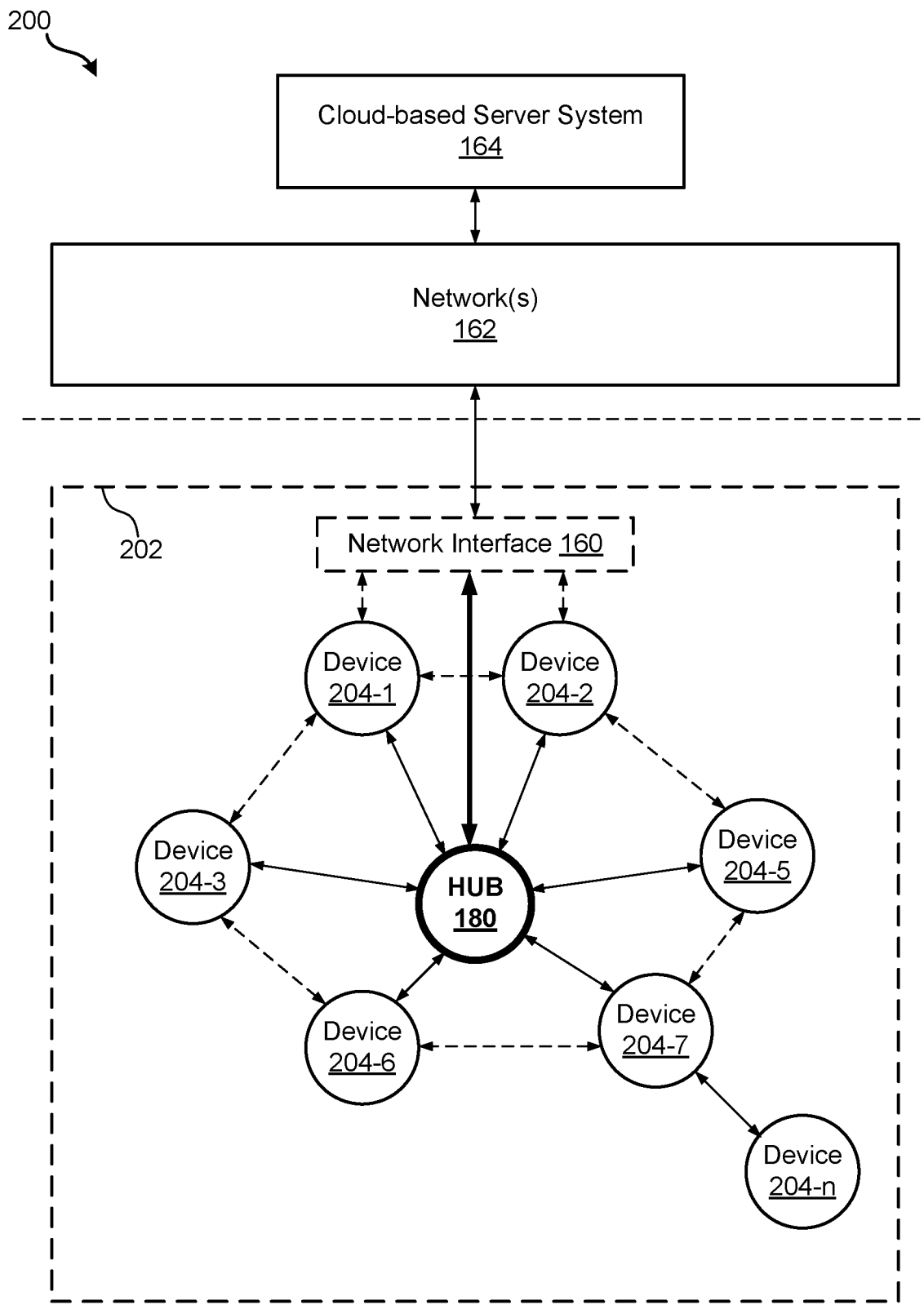
FIG. 2 illustrates a block diagram of a representative network architecture that includes a smart home network.

FIG. 2 is a block diagram illustrating a representative network architecture 200 that includes a smart home network 202. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V or 240V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee®, ZWave®, 6LoWPAN, Thread®, Weave®, Bluetooth®, etc.

In some implementations, some low-power nodes are incapable of bidirectional communication. These low-power nodes send messages, but they are unable to "listen." Thus, other devices in the smart home environment 100, such as the spokesman nodes, cannot send information to these low-power nodes. In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170 of FIG. 1, which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet to the server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee®, Z-Wave®, Insteon®, EuOcean®, Thread®, OSIAN®, Bluetooth Low Energy® and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
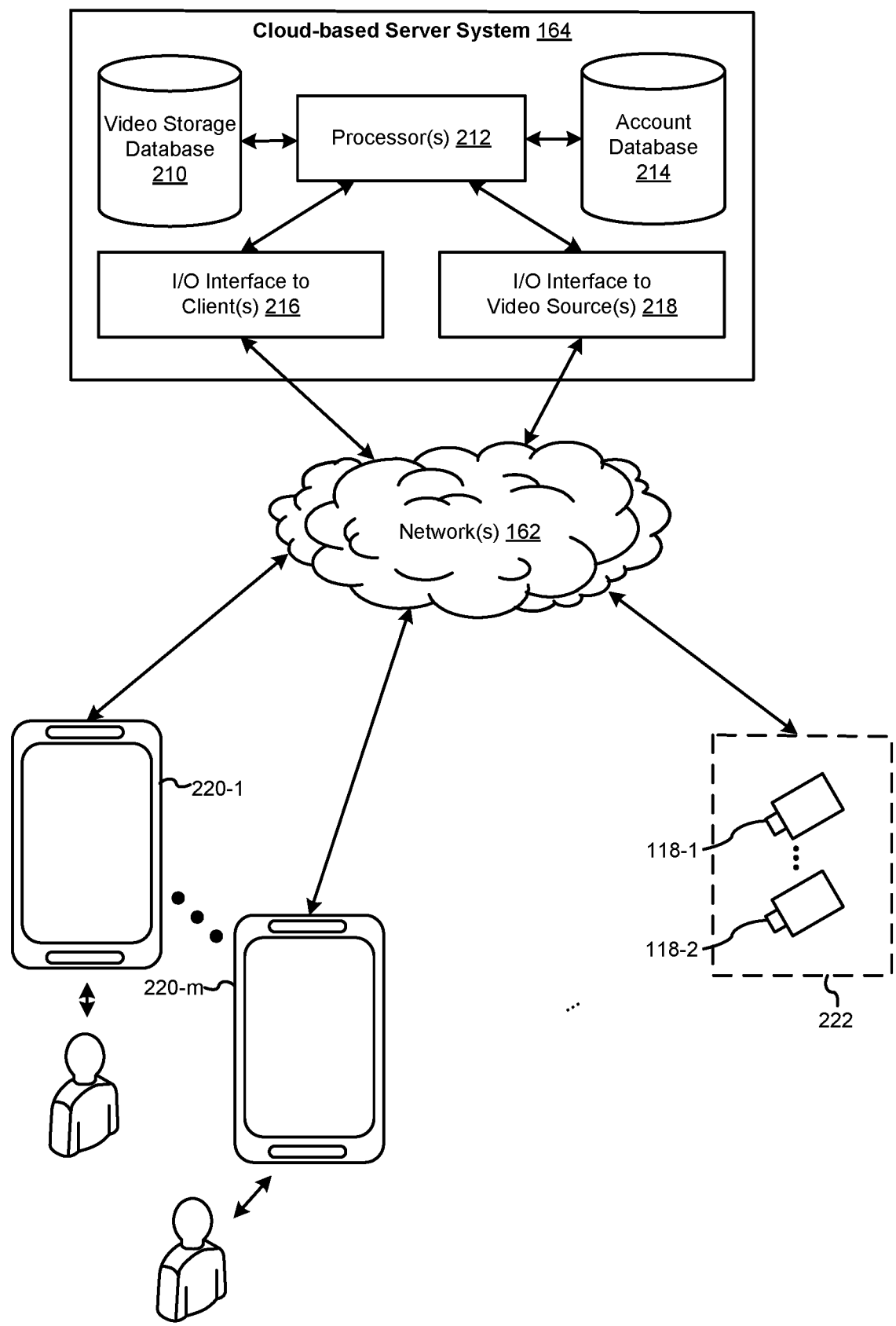
FIG. 3 illustrates a block diagram representative of an operating environment in which a cloud-based server system provides data processing for monitoring and facilitating review of events (e.g., motion, audio, security, etc.) in video and audio streams captured by video and audio capture devices.

FIG. 3 illustrates a representative operating environment in which a server system 164 provides data processing for monitoring and facilitating review of events (e.g., motion, audio, security, etc.) in video streams captured by video cameras 118 and/or doorbell cameras 106. As shown in FIG. 3, the server system 164 receives video data from video sources 222 (including cameras 118, doorbell cameras 106, and/or other smart home devices having an integrated video and audio capture system) located at various physical locations (e.g., inside homes, restaurants, stores, streets, parking lots, and/or the smart home environments 100 of FIG. 1). Each video source 222 (which can include video and audio-capture devices in addition to cameras 118) may be bound to one or more reviewer accounts, and the server system 164 provides video monitoring data for the video source 222 to client devices 220 associated with the reviewer accounts. For example, the portable electronic device 166 is an example of the client device 220. In some implementations, the server system 164 is a video processing server that provides video processing services to video sources and client devices 220.

In some implementations, each of the video sources 222 includes one or more video cameras 118, doorbell cameras 106, or other video and audio capture devices that capture video and send the captured video to cloud-based server system 164 substantially in real-time. In some implementations, each of the video sources 222 can include a controller device (not shown) that serves as an intermediary between the one or more cameras and the cloud-based server system 164. The controller device receives the video data from the one or more cameras, optionally performs some preliminary processing on the video data, and sends the video data to the server system 164 on behalf of the one or more cameras substantially in real-time. In some implementations, each camera has its own on-board processing capabilities to perform some preliminary processing on the captured video data before sending the processed video data (along with metadata obtained through the preliminary processing) to the controller device and/or the cloud-based server system 164.

In accordance with some implementations, each of the client devices 220 (which can be a form of communication device) includes a client-side module. The client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules, each residing on a respective client device 220. The server-side module also provides server-side functionality for video processing and camera control for any number of the video sources 222, including any number of control devices and the cameras.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for accounts registered with the video processing server, where a respective user profile includes account credentials for a respective reviewer account, and one or more video sources linked to the respective account. The I/O interface to one or more video sources 218 facilitates communications with one or more video sources 222 (e.g., groups of one or more cameras and associated controller devices). The video storage database 210 stores raw video data (and possibly audio) received from the video sources 222, as well as various types of metadata, such as motion events, event categories, event category models, event filters, and event masks, for use in data processing for event monitoring and review for each reviewer account.

Examples of a representative client device 220 include communication devices such as a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 3 includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 222 cooperatively.

In some implementations, a video source 222 (e.g., cameras 118, doorbell 106, or some other video and audio capture device) transmits one or more streams of video data to the server system 164. In some implementations, the one or more streams may include multiple streams of respective resolutions and/or frame rates, of the raw video captured by the cameras 118 or smart doorbell 106. In some implementations, the multiple streams may include a "primary" stream with a certain resolution and frame rate, corresponding to the raw video captured by the cameras 118 or smart doorbell 106, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams are sent from the video source 222 directly to a client device 220 (e.g., without being routed to, or processed by, the server system 164). In some implementations, one or more of the streams are stored at the cameras 118 or smart doorbell 106 and/or a local storage device (e.g., a dedicated recording device), such as a digital video recorder (DVR). For example, in accordance with some implementations, the cameras 118 or smart doorbell 106 stores the most recent 24 hours of video footage recorded by the camera. In some implementations, portions of the one or more streams are stored at the cameras 118 or smart doorbell 106 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include a portion of the field of view or pixels of the primary stream) at the same or different resolution and/or frame rate as the "primary" stream, as described in greater detail in U.S. patent application Ser. No. 15/594,518, which is hereby incorporated by reference.

Figure 4:
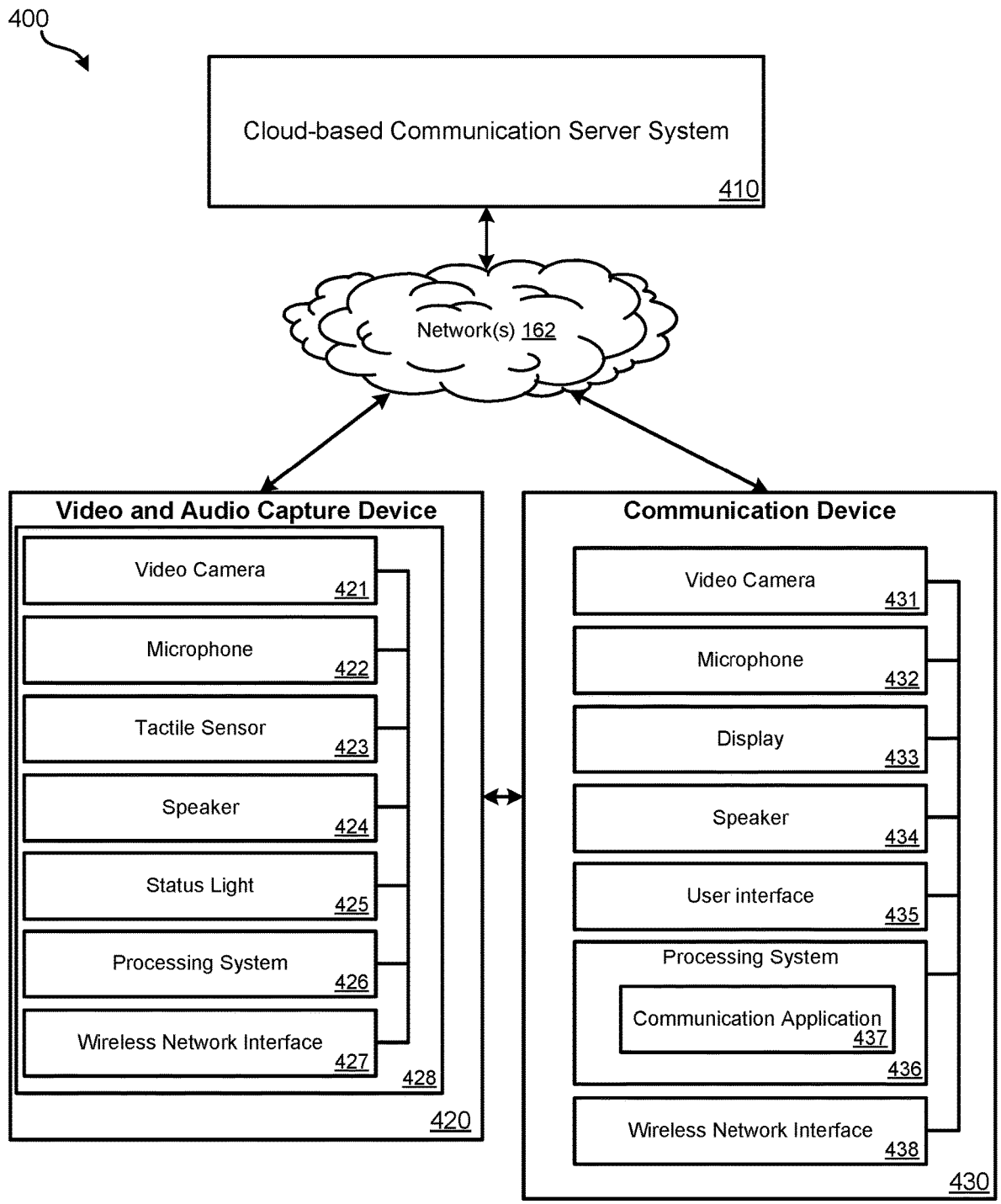
FIG. 4 illustrates an embodiment of an asymmetric video communication system.

FIG. 4 illustrates an embodiment of an asymmetric video communication system 400. Asymmetric video communication system 400 may include: cloud-based communication server system 410, network 415, video and audio capture device 420, and communication device 430. Video and audio capture device 420 can represent an embodiment of: cameras 118 or some other smart home device capable of capturing video and audio. Video and audio capture device 420 may include: video camera 421, microphone 422, tactile sensor 423, speaker 424, status light 425, processing system 426, and wireless network interface 427.

Video camera 421 and microphone 422 may serve to capture a stream of video and audio, respectively, of a region near video and audio capture device 420. Video camera 421 may have a field of view pointed in a fixed or adjustable direction. Video and audio captured using a video camera 421 and microphone 422 may be streamed via network 415 to cloud-based communication server system 410.

Video and audio capture device 420 may include tactile sensor 423. In some embodiments, tactile sensor 423 is an accelerometer. Such an accelerometer may detect acceleration of video and audio capture device 420. Such an accelerometer may provide acceleration measurements to processing system 426. Typically, significant acceleration measurements may be detected when video and audio capture device 420 is moved or some person or object impacts video and audio capture device 420. Referring to a person, someone may tap, knock, nudge, turn, shake, wiggle, or otherwise cause an acceleration event to be detected using the accelerometer functioning as tactile sensor 423. In other embodiments, some other form of tactile sensor may be used. For example, a gyroscope may be used to detect an impact or motion of video and audio capture device 420.

Speaker 424 may be used to output audio received from cloud-based communication server system 410. Status light 425 may be a single or multi-colored light (e.g., LED or multiple LEDs), that can output a status indication of video and audio capture device 420. For example, different colors and/or different flashing patterns can represent various illumination states that correspond to different statuses of video and audio capture device 420.

Processing system 426 may receive data from: video camera 421, microphone 422, and tactile sensor 423. Processing system 426 may output data to: speaker 424, and status light 425. Processing system 426 may stream data collected from video camera 421 and microphone 422 to cloud-based communication server system 410. Processing system 426 may analyze data received from tactile sensor 423 to determine if a request for an asymmetric communication link should be transmitted to cloud-based communication server system 410. If, for example, a detected amount of acceleration by tactile sensor 423 exceeds a stored and predefined acceleration threshold, processing system 426 may transmit a request for an asymmetric communication link to cloud-based communication server system 410. In some embodiments, multiple excursions of acceleration above the predefined acceleration threshold may be required to be detected by processing system 426 within a predefined period of time in order for a request for an asymmetric communication link to be transmitted to cloud-based communication server system 410. In other embodiments, a pattern detection process may be performed by processing system 426 to determine a pattern of acceleration events and the magnitude of such events. For instance, to initiate an asymmetrical communication link, a pattern of acceleration may be required to be detected by tactile sensor 423 as analyzed by processing system 426. This pattern of acceleration may be required to match a predefined stored definition of an acceleration pattern for an asymmetrical communication link request. In other embodiments, an indication of the pattern is transmitted to the cloud-based communication server system 410 as part of or with the request for the asymmetric communication link.

Processing system 426 may include one or more specialized or general purpose processors. Such processors may be configured to execute one or more sets of instructions that are stored by video and audio capture device 420 using one or more non-transitory computer readable mediums. It should be understood that in addition to processors and non-transitory computer readable mediums, video and audio capture device 420 may include various other components typically found in computerized devices, such as communication buses, power supplies, one or more wireless interfaces, memories, etc. Processing system 426 may communicate with cloud-based communication server system 410 via wireless network interface 427. Audio to be output by speaker 424 may be received by processing system 426 via wireless network interface 427. Similarly, an indication to be presented to nearby users may be received via wireless network interface 427 and output by processing system 426 via status light 425. For example, an illumination state (which can include a blinking or solid illumination pattern and/or a particular light color) may be indicative of a request having been transmitted, but yet having been accepted for an asymmetric communication link. Another illumination state may be used to indicate normal operation (e.g., video and audio being streamed, no request having been transmitted); another illumination state may be used to indicate an asymmetric communication link is open; and another illumination state may be used to indicate that the asymmetric communication link was refused. Wireless network interface 427 may use one or more of the previously described network communication protocols, such as IEEE 802.11 or, more specifically, WiFi®.

Housing 428 may house: video camera 421, microphone 422, tactile sensor 423, speaker 424, status light 425, processing system 426, and wireless network interface 427. Typically, when the user provides input to video and audio capture device 420, such as in the form of a tap or bump, such a tap or bump may be applied to housing 428 and may be sensed via tactile sensor 423.

Of note, video and audio capture device 420 may not have a display or at least not have a display that is capable of presenting an image or video. Therefore, while video camera 421 may be used to stream data to cloud-based communication server system 410, video may not be received by and/or presented by video and audio capture device 420. Audio, however, may be received via wireless network interface 427 and be caused to be output via speaker 424 by processing system 426.

Cloud-based communication server system 410 can represent cloud-based server system 164 of FIGS. 1-3. While FIG. 3 represents some of the storage and streaming components of cloud-based server system 164, cloud-based communication server system 410 represents componentry related to asymmetric communication links any associated requests. Further detail regarding cloud-based communication server system 410 is provided in relation to FIG. 5.

Communication device 430 can represent client devices 220. Notably, while video and audio capture device 420 does not have a display, communication device 430 includes display 433 for presenting video, such as video captured using video camera 421. Communication device 430 can include: video camera 431, microphone 432, display 433, speaker 434, user interface 435, processing system 436, and wireless network interface 438. As previously noted in respect to client devices 220, communication device 430 can be a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Video camera 431, microphone 432, speaker 434, and wireless network interface 438 may function as detailed in relation to the similar components of video and audio capture device 420. While video camera 431 is present, if an asymmetric communication link is active between video and audio capture device 420 and communication device 430, no video from video camera 431 may be streamed to video and audio capture device 420 (video and audio capture device may have no way of presenting video). Display 433 and user interface 435 may be combined in the form of a touchscreen that allows a user to touch or perform gestures directly on display 433. User interface 435 may also take other forms, such as a keypad, one or more buttons, a touchpad, or some other arrangement that allows a user to provide input to communication device 430.

Processing system 436 may include one or more specialized or general purpose processors. Such processors may be configured to execute one or more sets of instructions that are stored by communication device 430 using a non-transitory computer readable medium. It should be understood that in addition to processors and non-transitory computer readable mediums, communication device 430 may include various other components typically found in computerized devices, such as communication buses, power supplies, one or more wireless interfaces, memories, etc. Processing system 436 may communicate with cloud-based communication server system 410 via wireless network interface 427. Therefore, when an asymmetric communication link is present between video and audio capture device 420 and communication device 430, audio captured using microphone 432 may be streamed to video and audio capture device 420; video and audio captured using video camera 421 and microphone 422 may be streamed to communication device 430 and output via display 433 and speaker 434.

If processing system 436 of communication device 430 is a general-purpose processing system, one or more applications, including a communication application 437, may be executed by processing system 436. Communication application 437 may be a specialized application that is distributed by an operator of cloud-based communication server system 410. Communication application 437 may permit a user to log in to a user account hosted by cloud-based communication server system 410 and access services available through such user account. For example, access to video and audio captured using video camera 421 and microphone 422 may be available via cloud-based communication server system 410. Further, as detailed within this document, a user may be able to accept or deny a request for an asymmetric communication like initiated at video and audio capture device 420.

In some embodiments, another entity, such as a third-party cellular service provider may be in communication with network 162. Cloud-based communication server system 410 may communicate with the third parties cellular service provider in order to send a push notification to communication device 430. For example, if a request for an asymmetric communication link is received by cloud-based communication server system 410 from video and audio capture device 420, cloud-based communication server system 410 may send a request for a push notification to be transmitted by the third party cellular service provider to communication device 430. This push notification may be required to be viewed and dismissed by a user of communication device 430 before some or any function of communication device 430 is next used by the user. This notification may include information about the asymmetric communication link request, such as (a link or direct to) an image captured via video camera 421 and/or video clip captured by video camera 421. If a video clip is included, the video clip may include video captured by video camera 421 for a period of time before and/or period of time after the tactile input that triggered the request was detected by processing system 426 (based on data received from tactile sensor 423).

In some embodiments, video and audio capture device 420 may communicate directly with communication device 430 or may communication with communication device 430 via network(s) 162 without communicating with a separate cloud-based communication server system 410. For example, communication device 430 may be a baby monitor having a display and video and audio capture device 420 may be a streaming video camera that transmits video, either directly or via a network (e.g., a wireless local area network) to the baby monitor. In embodiments where no cloud-based communication server system 410 is present, some or all of the functionality detailed herein attributed to cloud-based communication server system 410 may incorporated as part of communication device 430 and/or video and audio capture device 420.

Figure 5:
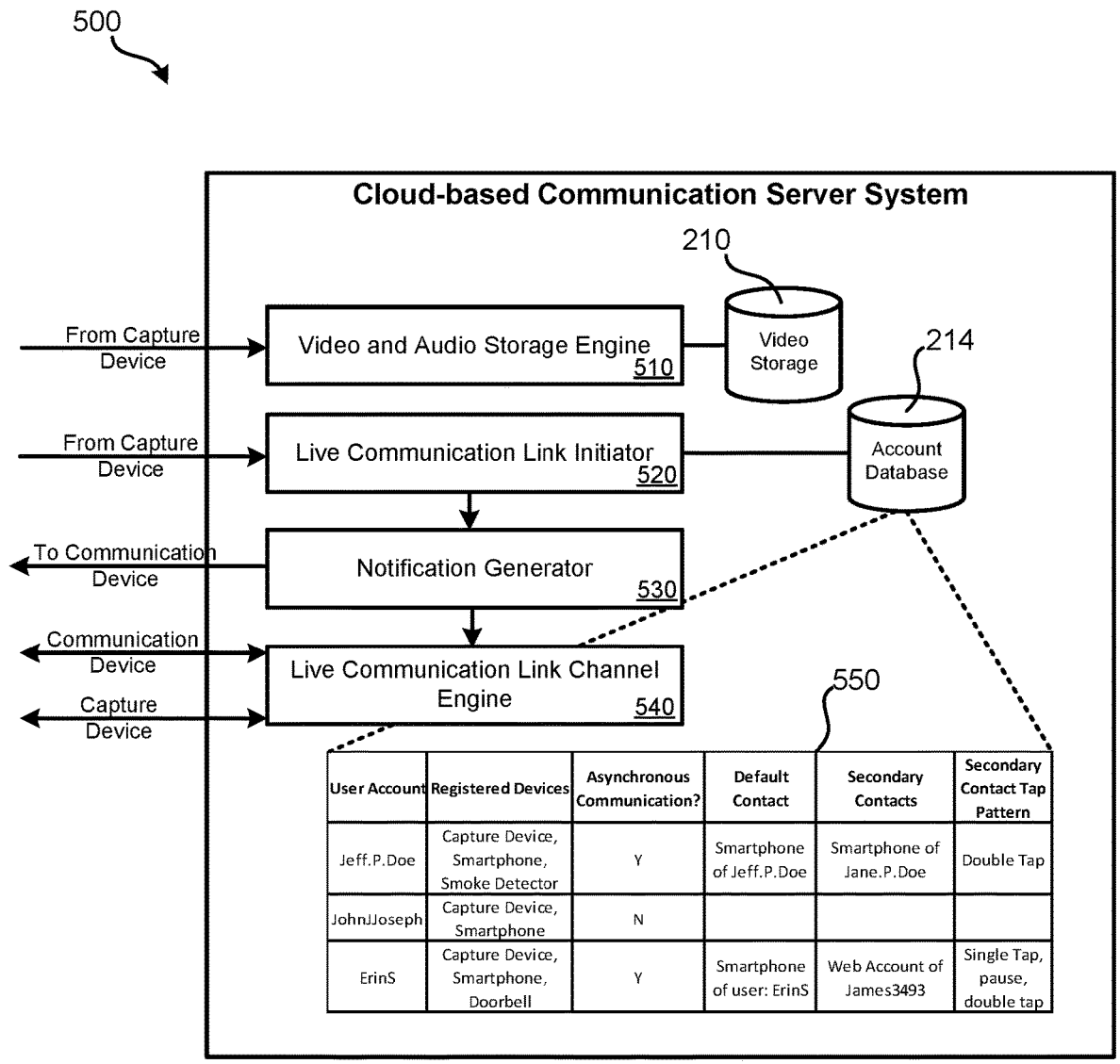
FIG. 5 illustrates an embodiment a cloud-based communication server system.

FIG. 5 illustrates an embodiment of cloud-based communication server system 500.

Cloud-based communication server system 500 can represent cloud-based communication server system 410 of FIG. 4 and/or cloud-based server system 164 of FIGS. 1-3. Cloud-based communication server system 500 can include one or more processors and/or one or more server systems which may be distributed geographically. Cloud-based communication server system 500 may include one or more specialized or general purpose processors. Such processors may be configured to execute one or more sets of instructions that are stored by cloud-based communication server system 500 using a non-transitory computer readable medium. It should be understood that in addition to processors and non-transitory computer readable mediums, cloud-based communication server system 500 may include various other components typically found in computerized devices, such as communication buses, power supplies, one or more wireless interfaces, memories, etc. cloud-based communication server system 500 may include: video and audio storage engine 510, communication link initiator 520, notification generator 530, and live communication link channel engine 540. Also present may be various databases previously detailed, including video storage database 210 and account database 214.

Video and audio storage engine 510 may include the I/O interface to one or more video sources 218 that facilitates communications with one or more video sources 222 (e.g., groups of one or more cameras and associated controller devices) as detailed in relation to FIG. 3. Video and audio storage engine 510 may serve to receive video and audio data from various video and audio capture devices such as video and audio capture device 420 of FIG. 4. Video and audio storage engine 510 receives streaming video, and possibly streaming audio, from a video and audio capture device and stores such video and audio to a database, such as video storage database 210. While video storage database 210 refers specifically to video, it should be understood that audio may be stored in the same or a separate linked database. It should be understood that video and audio from a capture device may be continuously stored by video and audio storage engine 510 regardless whether an asymmetric communication link is active or not. Therefore, if an asymmetric communication link is active, the video and audio may continue to be stored from the associated capture device; however, any audio routed in the opposite direction (that is, from the communication device to the video and audio capture device) may not be recorded or stored.

Live communication link initiator 520 may serve to receive and analyze requests for asymmetric communication links received from video and audio capture devices. Live communication link initiator 520 may receive an asymmetric communication link request, analyze such request, and determine a recipient linked with a communication device which is to receive the request for the asymmetric communication link. Communication link initiator 520 may access account database 214 to determine a contact and associated communication device linked with the video and audio capture device. For example, the video and audio capture device and the communication device may be linked with a user account. In some embodiments, live communication link initiator 520 may analyze a pattern of tactile information, such as acceleration data, received from the video and audio capture device in accordance with the asymmetric communication link request.

Based upon the video and audio capture device from which the asymmetric communication link request is received, live communication link initiator 520 may access a linked entry within account database 214. The linked account database entry may identify one or more contacts for routing of the asymmetric communication link request. Three sample entries 550 are illustrated from account database 214. It should be understood that these three sample entries 550 are merely exemplary and illustrate some of the possible data fields which may be present within account database 214. In other embodiments, fewer or greater numbers of data fields may be present. Further, such data fields may be spread across multiple databases rather than all being present within account database 214. For example, for the user account of "Jeff.P.Doe", two contacts are present: the smart phone linked with Jeff.P.Doe and a smart phone linked with Jane.P.Doe. By Jeff.P.Doe being the default contact, a single tactile input that is greater than the tactile threshold may result in an asymmetric communication link request received from the video and audio capture device linked with this account to be routed to the smart phone of Jeff.P.Doe. However, if accompanying data indicates that the pattern of tactile input is a double tap, the asymmetric communication link request may be routed to the smart phone of Jane.P.Doe. Regarding the second example entry, the user account of "JohnJJoseph" does not have asymmetric communication links enabled; as such, the video and audio capture device linked with this account may not transmit asymmetric communication link requests or such received asymmetric communication link requests may be ignored by cloud-based communication server system 500. For the third sample entry of user account "ErinS," a different secondary contact Pattern is indicated. If the tactile input pattern is indicative of a single tap, followed by a short pause, followed by a double tap, the asymmetric communication link request may be routed to the web account of "James3493."

Once live communication link initiator 520 has received an asymmetric communication link request, and has determined that the associated user account has such a feature enabled, and the appropriate recipient contact has been determined, such data may be routed to notification generator 530. Notification generator 530 may generate a notification for transmitting to the appropriate contact indicated from within account database 214. The notification generated by a notification generator 530 may be an in-application notification, a push notification (e.g., as detailed in relation to FIG. 4), SMS or MMS text message, email, phone call, banner, desktop tray, or pop-up notification. Notification generator 530 may select the appropriate communication channel based on a user preference noted in account database 214 or a default communication channel used by cloud-based communication server system 500. The notification generated by notification generator 530 may indicate the video and audio capture device from which the request originated (e.g., in the form of a location name linked with the capture device, such as "bedroom," "living room," "kitchen," or some other room designator). The notification may also include a still video frame captured by the video and audio capture device at the time the tactile input was provided to the capture device that triggered the request. In other embodiments, the still video frame may be captured for a predefined amount of time before or after the tactile input was provided to the capture device that triggered the asymmetric communication link request. Since the video is being constantly streamed to the cloud-based communication server, video frames from prior to the tactile input may be available. In other embodiments, a short video clip is provided as part of the notification rather than a still image. This video clip may include audio. The video clip may be captured before, after, or in a period of time that spans from before until after the tactile input that triggered the asymmetric communication link request. As such, the video clip may temporally span from before the input until after the input. The notification generator 530 may then send the generated notification to the communication device determined based on the contact information linked with the video and audio capture device in account database 214.

Live communication link channel engine 540 may relay audio and video data (e.g., packets) from the capture device to the communication device for live or real-time presentation and may relay audio data (e.g., packets) from the communication device to the capture device for live or real-time output. Once this asynchronous communication link has been initiated, the communication link may continue to be provided by live communication link channel engine 540 until a user of the communication device severs the link by, for example, closing an application being executed by the communication device that enables audio captured by the communication device to be transmitted to live communication link channel engine 540. In some embodiments, tactile input to the capture device provided by a person in the vicinity of the capture device may indicate that the person desires the communication link to be severed. However, this may only be in the form of a request that is transmitted to and presented on the communication device. Ultimately, the user of the communication device may make the decision of if and when the asynchronous communication link is severed. It should be understood that regardless of the state of the asynchronous communication link, video and audio storage engine 510 may store continuous video and audio from the capture device. Therefore, effectively, if a conversation occurred between a person present in the vicinity of the captured device and a user of the communication device, at least the side of the conversation (and including video) from the capture device may be stored in video storage 10 by video and audio storage engine 510. Audio from the communication device may also be stored or may be filtered out (either by the captured device or by video and audio storage engine 510).

Figure 6:
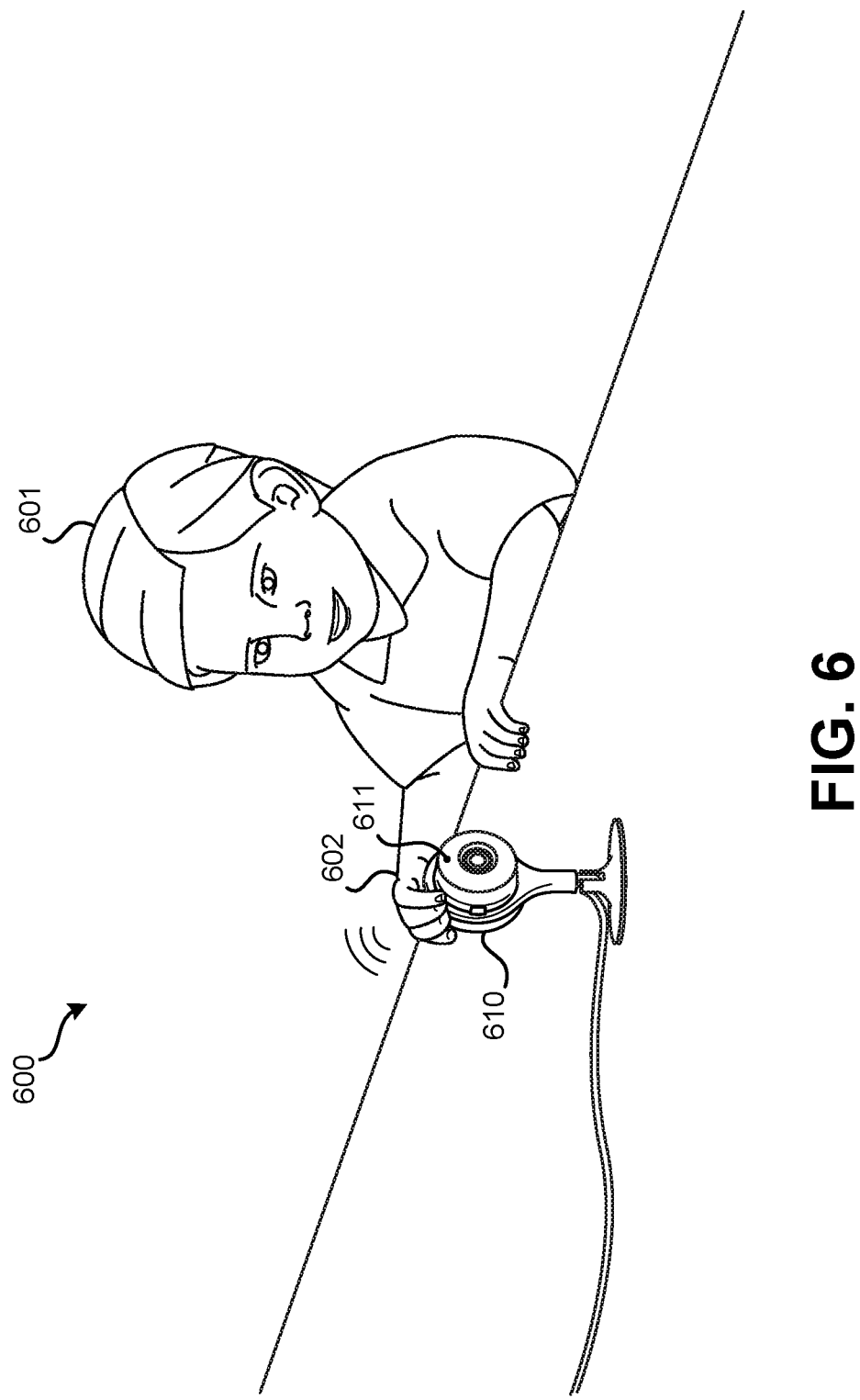
FIG. 6 illustrates an embodiment of a person requesting an asymmetric communication link via a video and audio capture device.

FIG. 6 illustrates an embodiment 600 of a person requesting an asymmetric communication link via a video and audio capture device. In embodiment 600, child 601 is tapping with his hand 602 a housing of video and audio capture device 610. In response to this tapping, an asymmetric communication link request may be transmitted to a cloud-based server system as detailed in relation to the systems of FIGS. 1-5 and the method of FIGS. 7 and 8. The tapping pattern performed by child 601 may be dependent on the person with whom child 601 desires to communicate. An illumination state of status light 611 may change based on the tapping performed by hand 602 triggering a request being sent to the cloud-based server system. While the example of embodiment 600 involves a child, it should be understood that this is merely exemplary. Various persons, such as the elderly, workmen, or any person who finds it more expedient to communicate with a user via a video and audio capture device, may wish to initiate an asymmetric video communication link with a user.

Figure 7:
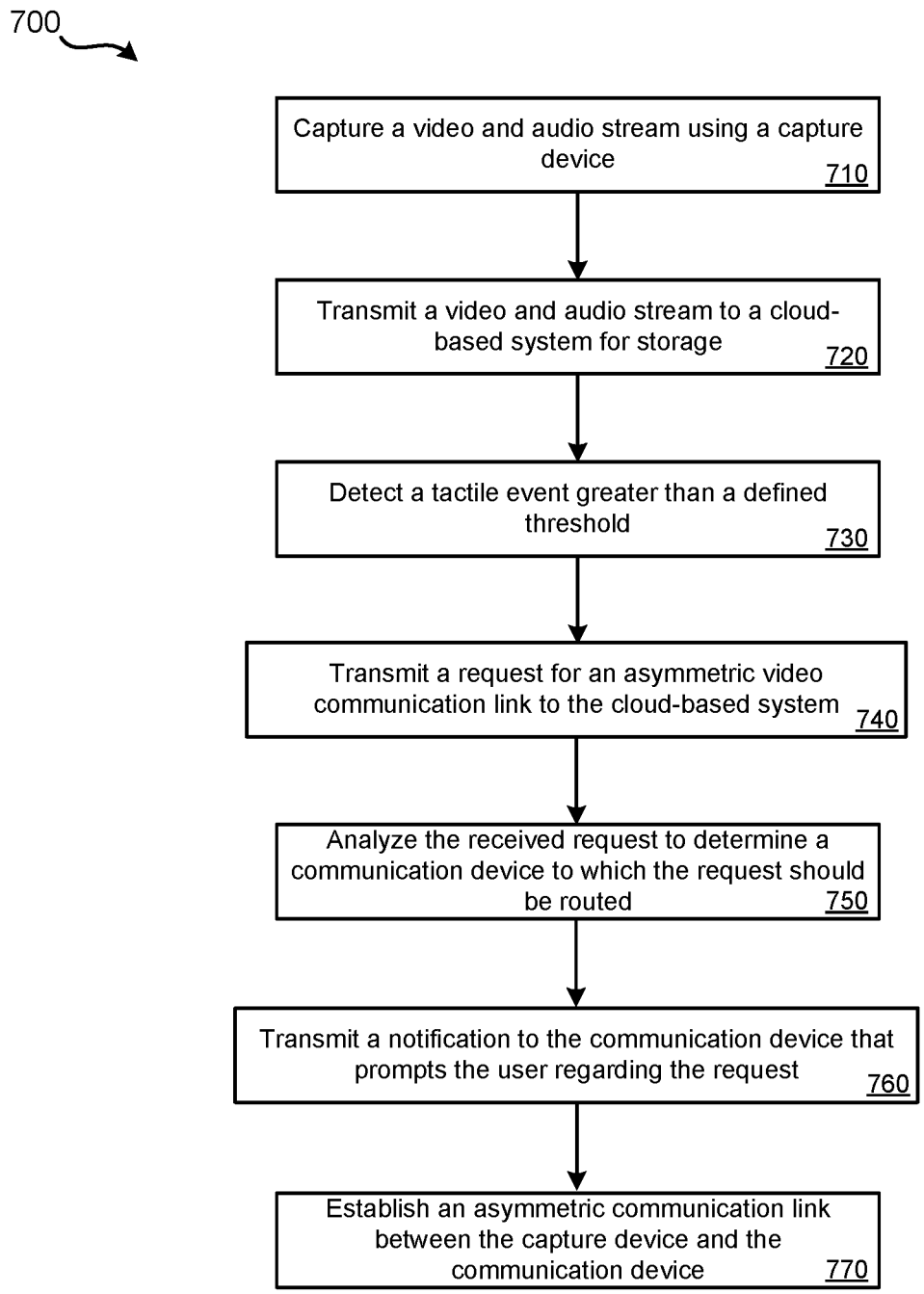
FIG. 7 illustrates an embodiment of a method for establishing an asymmetric communication link.

Various methods may be performed with the systems detailed in FIGS. 1-5. FIG. 7 illustrates an embodiment of a method 700 for establishing an asymmetric communication link. Method 700 may be performed using the systems and devices of FIGS. 1-5. Specifically, referring to FIG. 4, each step of method 700 may be performed using video and audio capture device 420, communication device 430, and/or cloud-based communication server system 410.

At block 710, a video and audio stream may be captured using a capture device, such as video and audio capture device 420. This video and audio data stream may be transmitted to a cloud-based system continuously or near continuously for storage at block 720. Therefore, such as for a rolling period of time, the cloud-based system may store video and audio captured by the capture device allowing a user to retrieve video and audio for desired time period for review. The cloud-based system for storage may be a service provided by the same cloud-based server system as cloud-based communication server system 410. In some arrangements, the capture device may wirelessly stream video and audio data via a Wi-Fi network to a router which is connected with an internet service provider (ISP) and the Internet. The video and audio data may be transmitted to the cloud-based system for storage via the Internet. This data may be indicated as being associated with a particular capture device and/or a particular user account.

At block 730, while video and audio are being captured and transmitted by the capture device to the cloud-based system for storage, a tactile event may be detected by the capture device. The tactile event may be detected as being greater than a defined threshold. In some embodiments, acceleration is used as the measure of the tactile of event. An onboard accelerometer of the capture device may detect one or more acceleration events that exceed the defined acceleration threshold stored by the capture device. In some embodiments, rather than a single acceleration event being greater than the defined threshold, it may be required that multiple acceleration events greater than the defined threshold may need to occur within a defined period of time for a tactile event to be determined as having occurred. Additionally or alternatively, a pattern of acceleration events may be detected by the capture device. Variances in timing and magnitude of the acceleration events may be detected by the capture device. In other embodiments, tactile events are measured using a metric other than acceleration. It should be understood that tactile events refer to input provided to the capture device other than a button push or other form of input provided directly to a dedicated user input component, such as a touch screen, touch pad, switch, or knob. In some embodiments, the accelerometer located onboard the capture device may be used for one or more additional uses, such as detecting if the capture device has been moved. Such movement may be indicative of an intruder at a location, such as a burglar, moving the capture device in an attempt to avoid detection.

At block 740, in response to detecting the tactile event at block 730, a request for an asymmetric video communication link may be transmitted to the cloud-based system at block 740. The cloud-based system to which the request is transmitted may be the same cloud-based system used for storage at block 720 or may be a separate cloud-based system that is specifically for communication links. If the same cloud-based system, the term cloud-based storage server system or cloud-based communication server system may be used interchangeably. The request transmitted at block 740 may indicate the capture device from which the request is originating and/or an indication of the user account that is linked with the capture device. If a pattern of tactile data, such as acceleration data, has been captured by the capture device, a pattern indication (which is indicative of the pattern detected at the capture device) may be transmitted as part of or in association with the request for the asymmetric communication link.

At block 750, the cloud-based system may analyze the received request to determine a communication device to which the request should be routed. Block 750 may involve the cloud-based system performing a lookup of account data to determine a user account that is linked with the capture device. The account data may indicate a particular user or device that has been designated to receive such requests. In some embodiments, the request may be transmitted to all devices that have been linked with the user account. In some embodiments, if pattern data has been received with the request for the asymmetric video communication link, the pattern data may be used to determine a particular communication device among multiple communication devices that are linked with the user account. Therefore, different predefined patterns may be linked with different communication devices that are linked with the same user account. In some embodiments, in response to block 750, method 700 may proceed to block 770 at which an asymmetric communication link is established between the capture device and communication device. In other embodiments, method 700 may proceed to block 760.

At block 760, a notification may be transmitted to the communication device that prompts a user of the communication device that a request for an asymmetric video communication link has been received at the capture device. The notification may be a push notification (which may be relayed by a cellular service provider of the communication device), a text message, an email, an automated voice call, and/or an application notification. The notification of block 760 may indicate that an asynchronous communication link request has been received from the capture device or that movement has been detected at the capture device. The notification may further include video, an image, and/or audio that was captured using the capture device a predefined amount of time before, at, or a predefined time after the request was detected by the capture device. In some embodiments, if a video clip is to be included with the notification, the video clip may span for a predefined amount of time prior to the tactile event indicative of the request for a predefined period of time after the tactile event. For some embodiments, a circular semiconductor video memory can be used to continuously capture the most recent video clip that will become of interest upon tactile event detection. The notification may trigger the user to open an application associated with the capture device. This application may allow a user to view a live or a real-time stream of video and audio from the capture device. The user of the communication device may have the option to activate audio to communicate with a person in the vicinity of the capture device.

In some embodiments, in response to the notification being received by the communication device, the communication device may transmit a receipt to the cloud-based server system. The cloud-based server system may then transmit a receipt indication to the capture device which may trigger a change in an illumination state of a status light of the capture device. This change in illumination state may indicate to a person in the vicinity of the capture device that the notification has been successfully sent to and/or received by the communication device. If the user of the communication device dismisses the notification, a receipt indication may be transmitted to the capture device by the cloud-based server system that triggers a change in the illumination state of the status light of the capture device to indicate that the asynchronous communication link will not be activated. Regardless of whether the notification results in the asynchronous communication link being activated or not, video and audio may continue to be captured by the capture device and stored by the cloud-based system for storage at block 710 and 720.

At block 770, the asymmetric communication link may be established between the capture device and the communication device. The asynchronous communication link may be established by a user launching an application or webpage that requests and presents real time live video received by the cloud-based server system from the capture device. The asymmetric communication link being established may include: real-time or live video and audio being presented and output, respectively, by the communication device from the capture device. This video and audio may be streamed to the communication device via the cloud-based server system. Live audio may also be streamed from the communication device to the capture device. In some embodiments, rather than audio being continuously streamed from the communication device to the capture device, the communication device may present an interface that allows a user to capture audio snippets using the communication device and transmit such audio snippets to the capture device via the cloud-based server. Therefore, for example, a user may be required to hold down a real or virtual button on the communication device to capture audio from the communication device which is then transmitted to the capture device via the cloud-based server. In other embodiments, in response to the asymmetric communication link being established, continuous audio captured via a microphone of the communication device is streamed to the capture device for output. As previously noted, in some embodiments, rather than a notification being transmitted to the communication device, in response to block 750, the asymmetric communication link at block 770 may be established. This may involve audio being captured by the communication device and transmitted to the capture device for output without input being provided to the communication device by the user indicating an immediate desire to activate such an asynchronous communication link.

Figure 8:
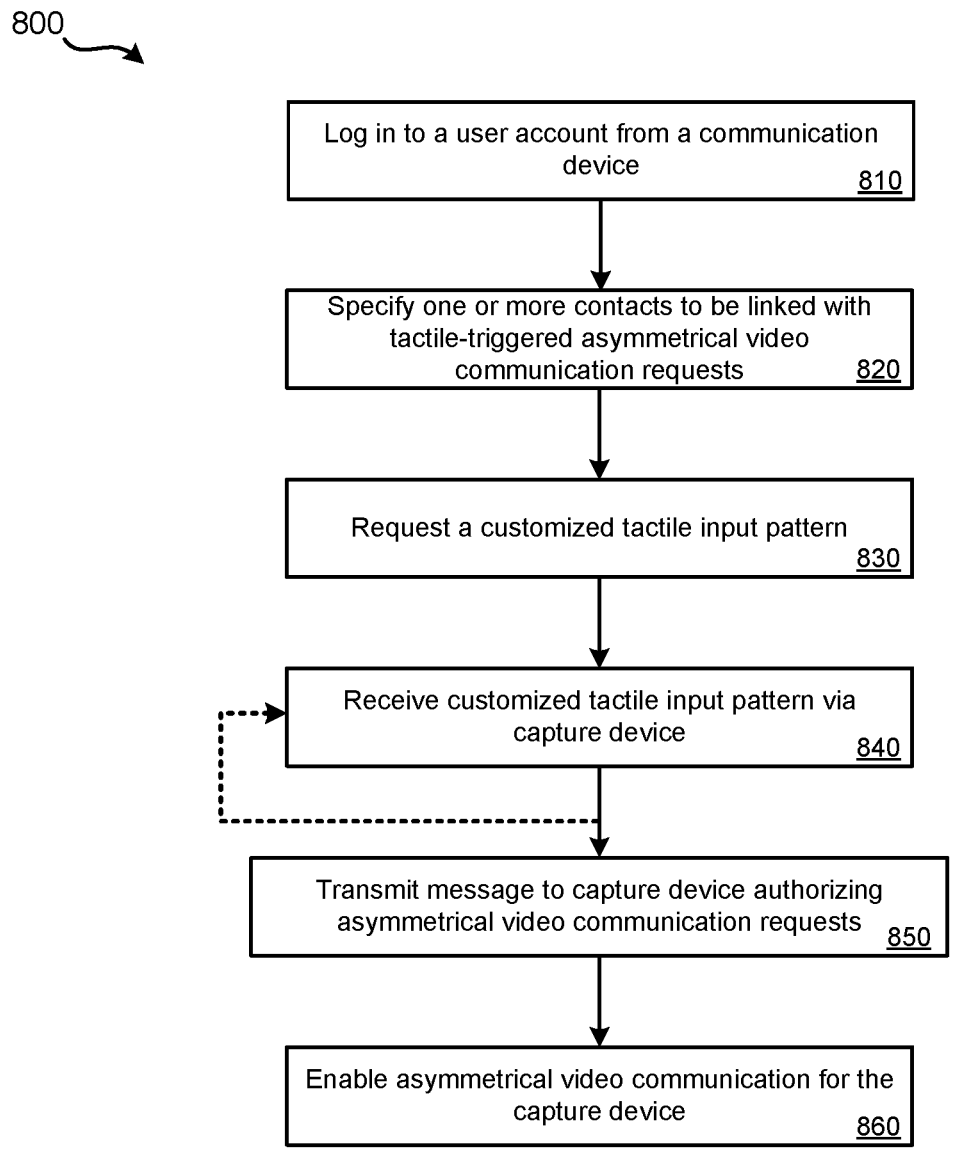
FIG. 8 illustrates an embodiment of a method for enabling asymmetrical video communication for a video and audio capture device.

FIG. 8 illustrates an embodiment of a method 800 for enabling asymmetrical video communication for a video and audio capture device. Method 800 may be performed using the systems and devices of FIGS. 1-5. Specifically, referring to FIG. 4, each step of method 800 may be performed using video and audio capture device 420, communication device 430, and/or cloud-based communication server system 410. Method 800 may be performed prior to method 700 being performed for a first time.

At block 810, a user may log in to a user account, possibly from a communication device at which the user desires to receive asynchronous communication link requests. Such a login may occur via an application that is executed by the communication device. Such an application may be downloaded from an application store ("app store") or some other remote repository of applications. At block 820, the user may provide input that specifies one or more contacts to be linked with asymmetric video communication requests. This may be the communication device and user himself. In other embodiments, the user may specify some other user account, communication device, or user that should be contacted if an asynchronous communication request is received.

If multiple users are to be individually contactable via different tactile input patterns, block 830 may be performed. At block 830, the application may request that the user input a customized tactile input that is to be linked with the specified one or more contacts of block 820. This request may be in the form of a message presented on a display screen of the communication device. Further, this request may indicate that the user should input the tactile input pattern to the capture device or directly to the communication device. If to be provided to the capture device, method 800 may be performed while the user and communication device are in close proximity to the capture device.

At block 840, the customized tactile input pattern may be received. In some embodiments, this customized tactile input pattern is received via the capture device or, alternatively, via the communication device. As part of block 830, if the customized tactile input pattern is to be received via the capture device, the application may alert the cloud-based server system that the customized tactile input pattern is to be received via the capture device and an indication that such input as to be received may be transmitted to the capture device. This may place the capture device in a mode in which such a customized tactile input pattern can be received. An illumination state of the status light of the capture device may be set to indicate that the capture device is ready to receive the customized tactile input pattern. After the customized tactile input pattern has been received at block 840, whether via the capture device or via the communication device, the user may be prompted to repeat the customized tactile input pattern some number of additional times, such as one or two additional times. The customized tactile input pattern may have variances in the magnitude and timing of tactile input (e.g., taps). Blocks 823, 840 may be repeated such that different customized tactile input patterns may be set up for different communication devices and/or users or user groups. Therefore, once asymmetric video communication requests have been activated, these different customized tactile input patterns may be used to send notifications requesting asymmetric communication links with different users to different user groups. A common use case of this arrangement may be if a child in the vicinity of a capture device wishes to contact only her mother or only her father.

Once at least one contact has been linked with tactile triggered asymmetric video communication requests, a message may be transmitted to the cloud-based server system and/or the capture device that authorizes asymmetric video communication requests to be transmitted at block 850. At block 860, asymmetrical video communication is enabled. This can include a flag or data field being set at the capture device and/or cloud-based server system that enables asymmetrical video communication. Prior to block 850, tactile input provided to the capture device may not trigger the capture device to send an asymmetric video communication link request to the cloud-based server system or the cloud-based communication server system may not forward a notification or establish such a communication link with a communication device in response to receiving an asymmetric communication link request from the capture device. If authorization for asymmetric video communication link requests is enforced by the capture device, data may be stored by the capture device indicating that asymmetric video communication requests can now be transmitted to the cloud-based server system. If authorization for asymmetric video communication link requests is enforced by the cloud-based server system, the capture device may continue to function as prior to block 850. That is, tactile input information above a threshold may be forwarded to the cloud-based server system for interpretation and, possibly, for creation of a notification of a request for an asymmetric video communication link to a communication device or user linked with the capture device and/or the tactile pattern.

One or more of the described embodiments may be particularly advantageous when adapted for use in so-called sleepy capture devices, which are often battery-only devices which have a very limited power budget, or, if they are not power constrained, have other limitations or desired attributes (e.g., to produce very little heat, to produce minimal RF emissions, etc.) such that it is desirable to keep their higher-powered radio communications chips (and/or higher-power processors) in a sleep state for most of the time. For some embodiments, there is provided a capture device with an RF chip and imaging system that stays off for substantial periods of time, but is equipped with an accelerometer or other tactile sensor that causes the capture device to "wake up" (e.g., transition to a higher-power mode) when a sufficiently strong tactile tap or bump event is sensed, and the asymmetric communication session is started at that point. This arrangement may save power because the only component or one of the only components that needs to stay awake is the accelerometer/tactile sensor, which can be formed from very low-power components.

According to some embodiments, the capture device is further equipped with a motion sensor and a circular internal semiconductor video buffer (e.g., capable of keeping 30-300 seconds of video), this configuration can be very advantageous when configured to operate as follows: the device stays in a deep sleep most of the time, with RF radio chips and imaging systems in a sleep state and, optionally, even the tactile sensor in a sleep state; the deep sleep state continues unless and until motion is detected, at which point a first, lower-powered wake state is entered in which the network interface (e.g., RF radio chip) remains asleep but the imaging system fills the circular buffer continuously as motion is detected and the tactile sensor waits to sense a tactile event; the lower-powered wake state continues (while motion is still detected, otherwise it goes back into deep sleep) until a tactile event is sensed, at which point a higher-powered wake state is entered in which the RF radio chip is also activated and the asymmetric communication session is started, the asymmetric communication session including an RF upload of the buffered video content for review if desired. This particular functionality, which can be the sole modality of the capture device in some embodiments and a user-selectable modality in other embodiments, can be particularly advantageous for a scenario of a children's play room as follows: the capture device sleeps deeply most of the time if no children are present; if children are present, then a 30-300 second history is kept locally but energy is not expended in RF uploading; and if a child then walks up and taps the capture device, then the asymmetric communication session is established and is accompanied by a reviewable 30-300 seconds of recent video, which would allow the parent or other viewer to see what also happened in the immediate 30-300 seconds before the camera was tapped. Thus, for example, if Child gets a boo-boo and then taps the capture device to talk to Mom, Mom can review the buffered video to see how it happened. In this manner there is an advantageous best-of-both-worlds provided, in that there is a brief video history available in conjunction with the child-friendly asymmetric communication session feature, while at the same time being provided in a generally sleepy device that saves power, which can facilitate the capture device being a battery-only device.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An asymmetrical video communication system, comprising:
   an application executed using one or more processors of a mobile device, wherein the mobile device comprises a mobile device display; a mobile device microphone; and a mobile device speaker; and
   a video and audio capture device, comprising: a housing; one or more processors housed by the housing; a video camera housed by the housing; a microphone housed by the housing; a speaker housed by the housing; and an accelerometer housed by the housing, wherein:
      the video and audio capture device does not have a video display;
      in response to detecting an acceleration of the housing over a predefined acceleration threshold, an acceleration-triggered asymmetrical video communication request is caused to be transmitted to a cloud-based communication server system; and
   the cloud-based communication server system is configured to:
      receive, from a device, a request to log into a user account of a plurality of user accounts, wherein the user account is linked with the video and audio capture device;
      receive, from the device while logged into the user account, an indication of a default contact and a secondary contact, wherein:
         the secondary contact is linked to an acceleration pattern; and
         the default contact is linked to other instances of acceleration over the predefined acceleration threshold;
      receive the acceleration-triggered asymmetrical video communication request from the video and audio capture device;
      determine the user account from the plurality of user accounts that is linked with the video and audio capture device from which the acceleration-triggered asymmetrical video communication request was received;
      select the default contact from the default contact and the secondary contact with which to establish an acceleration-triggered asymmetrical video communication link based on detecting the acceleration of the housing over the predefined acceleration threshold and comparing to the acceleration pattern;
      establish the acceleration-triggered asymmetrical video communication link between the application executed by the mobile device of the contact and the video and audio capture device based on the acceleration pattern, wherein:
         video and audio captured using the video and audio capture device are streamed via the cloud-based communication server system to the application and audio captured by the mobile device is streamed via the cloud-based communication server system to the video and audio capture device; and
      video is not streamed from the mobile device to the cloud-based communication server system or to the video and audio capture device.

2. The asymmetrical video communication system of claim 1, wherein the cloud-based communication server system is further configured to: transmit a request to the application executed by the mobile device based on the application being linked with the user account in response to receiving the acceleration-triggered asymmetrical video communication request.

3. The asymmetrical video communication system of claim 2, wherein the mobile device is configured to:
   present a notification indicative of the request in response to receiving the request for the acceleration-triggered asymmetrical video communication link; and
   in response to user input provided in response to the presented notification, the application executed by the mobile device is configured to cause an activation request to be transmitted to the cloud-based communication server system.

4. The asymmetrical video communication system of claim 3, wherein the cloud-based communication server system is configured to establish the acceleration-triggered asymmetrical video communication link between the application executed by the mobile device and the video and audio capture device based on receipt of the activation request.

5. The asymmetrical video communication system of claim 3, wherein the cloud-based communication server system is further configured to transmit a picture captured by the video and audio capture device as part of the notification, wherein the picture was captured based on the video and audio capture device detecting the acceleration over the predefined acceleration threshold.

6. The asymmetrical video communication system of claim 3, wherein the cloud-based communication server system is further configured to transmit a video clip captured by the video and audio capture device as part of the notification, wherein:
   the video clip was captured based on the video and audio capture device detecting the acceleration over the predefined acceleration threshold; and
   the video clip temporally spans from before the video and audio capture device detected the acceleration over the predefined acceleration threshold until after the video and audio capture device detected the acceleration over the predefined acceleration threshold.

7. The asymmetrical video communication system of claim 1, wherein the acceleration pattern over the predefined acceleration threshold is indicative of a user performing a sequence of taps interspersed with at least one pause on the housing of the video and audio capture device.

8. The asymmetrical video communication system of claim 1, wherein the acceleration-triggered asymmetrical video communication request to be transmitted to the cloud-based communication server system is transmitted by the video and audio capture device in response to detecting multiple distinct instances of acceleration greater than the predefined acceleration threshold within a predefined period of time.

9. The asymmetrical video communication system of claim 8, wherein the video and audio capture device is further configured to:
   transmit a pattern indication to the cloud-based communication server system, wherein the pattern indication indicates a number of distinct instances of acceleration greater than the predefined acceleration threshold within the predefined period of time.

10. The asymmetrical video communication system of claim 9, wherein the cloud-based communication server system is further configured to determine the user account from the plurality of user accounts at least partially based on the pattern indication.

11. The asymmetrical video communication system of claim 1, wherein the video and audio capture device further comprises a light and the video and audio capture device is further configured to change an illumination state of the light in response to the acceleration-triggered asymmetrical video communication request being transmitted.

12. A method for initiating and conducting asymmetrical video communication, the method comprising:
   receiving, by a cloud-based communication server system, a request to log into a user account that is linked with a video and audio capture device;
   receiving an indication of a default contact and a secondary contact, wherein:
      the secondary contact is linked to an acceleration pattern; and
      the default contact is linked to other instances of acceleration over a predefined acceleration threshold;
   detecting, by the video and audio capture device, an acceleration of a housing of the video and audio capture device over a predefined acceleration threshold;
   transmitting, by the video and audio capture device, an acceleration-triggered asymmetrical video communication request to the cloud-based communication server system in response to detecting the acceleration of the video and audio capture device over the predefined acceleration threshold, wherein the video and audio capture device does not have a video display;
   receiving, by the cloud-based communication server system, the acceleration-triggered asymmetrical video communication request from the video and audio capture device;
   determining, by the cloud-based communication server system, the user account that is linked with the video and audio capture device from which the acceleration-triggered asymmetrical video communication request was received;
   selecting, by the cloud-based communication server system, a contact from the default contact and the secondary contact with which to establish an acceleration-triggered asymmetrical video communication link based on detecting the acceleration of the housing over the predefined acceleration threshold and comparing to the acceleration pattern;
   establishing, by the cloud-based communication server system, the acceleration-triggered asymmetrical video communication link between the video and audio capture device and an application executed by a mobile device linked within the contact, wherein the mobile device comprises a display, microphone, and speaker; and
   streaming video and audio captured using the video and audio capture device via the cloud-based communication server system to the application and audio captured by the mobile device is streamed via the cloud-based communication server system to the video and audio capture device.

13. The method for initiating and conducting asymmetrical video communication of claim 12, further comprising:
   transmitting, by the cloud-based communication server system, a request to the application executed by the mobile device based on the application being linked with the user account in response to receiving the acceleration-triggered asymmetrical video communication request.

14. The method for initiating and conducting asymmetrical video communication of claim 13, further comprising:
   presenting, by the application of the mobile device, a notification indicative of the request in response to receiving the request for the acceleration-triggered asymmetrical video communication link; and
   causing, by the application an activation request to be transmitted to the cloud-based communication server system in response to user input provided in response to the presented notification.

15. The method for initiating and conducting asymmetrical video communication of claim 14, further comprising:
establishing, by the cloud-based communication server system, the acceleration-triggered asymmetrical video communication link between the application executed by the mobile device and the video and audio capture device based on receipt of the activation request.

16. The method for initiating and conducting asymmetrical video communication of claim 14, further comprising: transmitting, by the cloud-based communication server system, a picture captured by the video and audio capture device as part of the notification, wherein the picture was captured based on the video and audio capture device detecting the acceleration over the predefined acceleration threshold.

17. The method for initiating and conducting asymmetrical video communication of claim 14, further comprising:
transmitting, by the cloud-based communication server system, as part of the notification, a video clip captured by the video and audio capture device, wherein:
the video clip was captured based on the video and audio capture device detecting the acceleration over the predefined acceleration threshold; and
the video clip temporally spans from before the video and audio capture device detected the acceleration over the predefined acceleration threshold until after the video and audio capture device detected the acceleration over the predefined acceleration threshold.

18. The method for initiating and conducting asymmetrical video communication of claim 12, wherein the acceleration-triggered asymmetrical video communication request is transmitted to the cloud-based communication server system by the video and audio capture device in response to detecting multiple distinct instances of acceleration greater than the predefined acceleration threshold within a predefined period of time.

19. The method for initiating and conducting asymmetrical video communication of claim 18, further comprising:
transmitting, by the video and audio capture device, a pattern indication to the cloud-based communication server system, wherein the pattern indication indicates a number of distinct instances of acceleration greater than the predefined acceleration threshold within the predefined period of time; and
selecting, by the cloud-based communication server system, the user account from a plurality of user accounts at least partially based on the pattern indication.

20. The method for initiating and conducting asymmetrical video communication of claim 12, further comprising:
altering, by the video and audio device, an illumination state of a light in response to the acceleration-triggered asymmetrical video communication request being transmitted.

* * * * *